(12) United States Patent
Guo et al.

(10) Patent No.: US 9,176,813 B2
(45) Date of Patent: Nov. 3, 2015

(54) INFORMATION PROCESSING APPARATUS, CONTROL METHOD

(71) Applicant: FUJITSU LIMITED, Kawasaki-shi, Kanagawa (JP)

(72) Inventors: Zhaogong Guo, Koto (JP); Koichi Yasaki, Kawasaki (JP); Hideki Tanaka, Kawasaki (JP); Koichi Yokota, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 168 days.

(21) Appl. No.: 13/772,930

(22) Filed: Feb. 21, 2013

(65) Prior Publication Data

US 2013/0318392 A1    Nov. 28, 2013

(30) Foreign Application Priority Data

May 23, 2012 (JP) ................. 2012-117600

(51) Int. Cl.
| | |
|---|---|
| G06F 11/00 | (2006.01) |
| G06F 11/10 | (2006.01) |
| G06F 11/16 | (2006.01) |
| G06F 11/20 | (2006.01) |
| G06F 12/02 | (2006.01) |

(52) U.S. Cl.
CPC ........ G06F 11/1068 (2013.01); G06F 11/1666 (2013.01); G06F 11/2094 (2013.01); *G06F 12/0246* (2013.01)

(58) Field of Classification Search
CPC ......................... G06F 11/0793; G06F 11/1666
USPC ................................. 714/6.11, 6.13
See application file for complete search history.

(56) References Cited

U.S. PATENT DOCUMENTS

| | | | | |
|---|---|---|---|---|
| 8,041,991 | B2* | 10/2011 | McKean | ............ 714/6.32 |
| 2005/0114728 | A1 | 5/2005 | Aizawa et al. | |
| 2006/0236161 | A1 | 10/2006 | Tanaka et al. | |
| 2009/0222703 | A1 | 9/2009 | Kurashige | |
| 2009/0248987 | A1* | 10/2009 | Jung et al. | ............ 711/135 |
| 2010/0125751 | A1* | 5/2010 | McKean | ............ 714/5 |

(Continued)

FOREIGN PATENT DOCUMENTS

| | | |
|---|---|---|
| JP | 2001-522089 | 11/2001 |
| JP | 2003-150406 | 5/2003 |
| JP | 2005-71068 | 3/2005 |

(Continued)

OTHER PUBLICATIONS

Jim Hatfield, "SMART Attribute Annex", S.M.A.R.T. Attribute Annex (http://www.t13.org/documents/UploadedDocuments/docs2005/e05148r0-ACS-SMARTAttributesAnnex.pdf), Sep. 30, 2005, 5 pages.

(Continued)

*Primary Examiner* — Yolanda L Wilson
(74) *Attorney, Agent, or Firm* — Oblon, McClelland, Maier & Neustadt, L.L.P.

(57) ABSTRACT

An information processing apparatus includes a memory, and a processor that executes a process in the memory. The process includes detecting a sign of a fault of a storage device that prohibits write access to a storage area of the storage device and permits read access to the storage area during a fault, and storing a copy of data to be written to the storage device as first copy data in the memory when the sign of a fault is detected.

17 Claims, 11 Drawing Sheets

(56) References Cited

U.S. PATENT DOCUMENTS

2011/0145633 A1* 6/2011 Dickens et al. ............... 714/6.1
2012/0239969 A1   9/2012 Dickens et al.

FOREIGN PATENT DOCUMENTS

| JP | 2005-157739 | 6/2005 |
|----|-------------|--------|
| JP | 2010-521014 | 6/2010 |
| WO | WO 99/23562 A1 | 5/1999 |
| WO | WO 2009/107286 A1 | 9/2009 |
| WO | WO 2011/092425 A1 | 8/2011 |

OTHER PUBLICATIONS

The Extended European Search Report issued Jun. 24, 2013, in Application No. / Patent No. 13156740.6-1960.

* cited by examiner

| LBA ADDRESS | DATA |
|---|---|
| 0x000xxxxxxxxx...xx | 0x143811903122294920000A1F1 |
| ... | ... |
| ... | ... |
| ... | ... |

```
SMART Attributes Data Structure revision number: 10
Vendor Specific SMART Attributes with Thresholds:
ID# ATTRIBUTE_NAME         FLAG    VALUE WORST THRESH TYPE     UPDATED  WHEN_FAILED RAW_VALUE
  1 Raw_Read_Error_Rate    0x000f  072   070   034    Pre-fail Always   -           23768603
  3 Spin_Up_Time           0x0003  073   073   000    Pre-fail Always   -           0
  4 Start_Stop_Count       0x0032  100   100   020    Old_age  Always   -           12
  5 Reallocated_Sector_Ct  0x0033  100   100   036    Pre-fail Always   -           0
  7 Seek_Error_Rate        0x000f  100   253   030    Pre-fail Always   -           944896
  9 Power_On_Hours         0x0032  100   100   000    Old_age  Always   -           5
 10 Spin_Retry_Count       0x0013  100   100   097    Pre-fail Always   -           0
 12 Power_Cycle_Count      0x0032  100   100   020    Old_age  Always   -           13
194 Temperature_Celsius    0x0022  020   048   000    Old_age  Always   -           20
195 Hardware_ECC_Recovered 0x001a  072   070   000    Old_age  Always   -           23768603
197 Current_Pending_Sector 0x0012  100   100   000    Old_age  Always   -           0
198 Offline_Uncorrectable  0x0010  100   100   000    Old_age  Offline  -           0
199 UDMA_CRC_Error_Count   0x003e  200   200   000    Old_age  Always   -           0
200 Multi_Zone_Error_Rate  0x0000  100   253   000    Old_age  Offline  -           0
202 TA_Increase_Count      0x0032  100   253   000    Old_age  Always   -           0
```

INFORMATION PROCESSING APPARATUS, CONTROL METHOD

CROSS-REFERENCE TO RELATED APPLICATION

This application is based upon and claims the benefit of priority of the prior Japanese Patent Application No. 2012-117600, filed on May 23, 2012, the entire contents of which are incorporated herein by reference.

FIELD

The embodiment discussed herein is related to an information processing apparatus and a control method.

BACKGROUND

Solid state drives (SSDs), which allow the speed of data access to be higher than hard disk drives (HDDs), have recently been being used. An SSD includes a storage area made of a flash memory or the like, and also includes a controller (SSD controller), a cache, and a storage area.

When accessing data in such an SSD, a computer uses an AT Attachment (ATA) command, as in the case of an HDD, so as to transfer write and read data to an SSD controller.

It is known that a storage element used for the storage area of an SSD has a limitation in the number of writing and therefore a fault would occur when an SSD is used for a long time.

To address this, a self-diagnostic function called Self-Monitoring Analysis and Reporting Technology (S.M.A.R.T.) for early detecting a disk fault and predicting a failure is known as a technology for detecting a failure of an SSD or HDD before the failure occurs.

As a technique for protecting data stored in the SSD, there is also a method in which an SSD controller detects a failure in the SSD and causes the storage area to be in a read-only (ReadOnly) mode, thereby prohibiting writing of data to protect the storage area.

In an information processing apparatus provided with such a conventional SSD, however, when writing of data is prohibited in the SSD by causing the storage area to be in a read-only mode, a controller would sometimes notify the information processing apparatus of the success of writing at the point when write data is stored in a cache of the SSD. Thereby, when an attempt is made to read data from an SSD, such a situation arises that data to be read is not saved in the SSD. This leads to a problem of reduction in reliability.

Japanese National Publication of International Patent Application No. 2010-521014 discloses an example of the related art.

"S.M.A.R.T. Attribute Annex", Sep. 30, 2005, [Mar. 21, 2012 searched], The Internet URL:http://www.t13.org/documents/UploadedDocuments/docs2005/e05148r0-ACS-SMARTAttributesAnnex.pdf) discloses a related technology.

SUMMARY

According to an aspect of the invention, an information processing apparatus includes a memory, and a processor that executes a process in the memory. The process includes detecting a sign of a fault of a storage device that prohibits write access to a storage area of the storage device and permits read access to the storage area during a fault, and storing a copy of data to be written to the storage device as first copy data in the memory when the sign of a fault is detected.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 illustrates S.M.A.R.T. values;

DESCRIPTION OF EMBODIMENT

Figure 1:
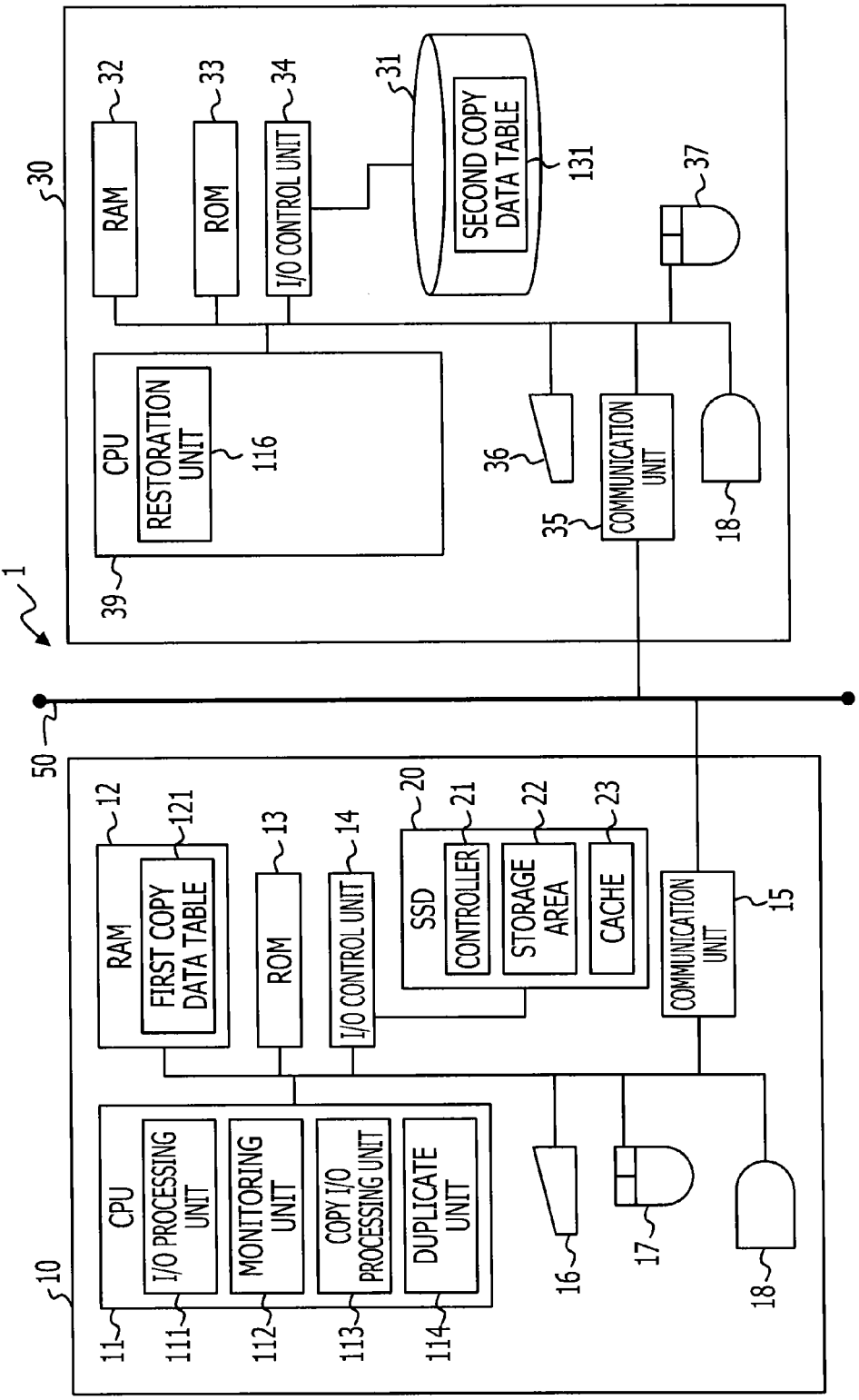
FIG. 1 is a block diagram schematically illustrating a configuration of a computer system as an exemplary embodiment.

Hereinafter, an embodiment according to this processing apparatus, processing method, processing program, and management apparatus will be described with reference to the accompanying drawings. However, an embodiment described hereinafter is only illustrative, and is not intended to exclude application of various modifications and techniques that are not specified in the embodiment. That is, the present disclosure may be carried out by modifying it in various ways (such as combining embodiments and modifications) without departing from its spirit. Each drawing is not intended to include only elements illustrated in the drawings; it may include other functions and the like.

(A) Embodiment

FIG. 1 is a block diagram schematically illustrating a configuration of a computer system as an exemplary embodiment.

The computer system 1 includes a computer 10 and a computer 30 as illustrated in FIG. 1. The computer 10 and the computer 30 are communicatively connected via a network 50.

The network 50 is a communication measure over which the computer 10 and the computer 30 are communicatively connected, and is a local area network (LAN), for example.

The computer 30 is an information processing apparatus provided outside of the computer 10 and includes a storage device 31. The computer 30 may be a server computer arranged in cloud computing, for example.

As illustrated in FIG. 1, the computer 30 includes a CPU 39, a random access memory (RAM) 32, a read only memory (ROM) 33, an input/output (I/O) control unit 34, a communication unit 35, a keyboard 36, a mouse 37, a display 38, and the storage device 31.

The communication unit 35 is a device that communicatively connects the computer 30 to the network 50, and is a communication adapter, such as a LAN board, for example.

A keyboard 16 and a mouse 17 are input devices with each of which an operator of the computer 10 performs input operations. A display 18 is a display device for displaying various information, messages, and the like to an operator.

The I/O control unit 34 controls passing data to and from input/output devices. In an example illustrated in FIG. 1, the I/O control unit 34 controls input and output of data to and from the storage device 31. The SSD 20 removed from the computer 10 as described later is connected to the computer 10, and the I/O control unit 34 also reads data from this SSD 20.

The ROM 33 is memory that stores an operating system (OS) and programs executed by the CPU 39, various data, and the like.

The RAM 32 is a main storage area for storing various data and programs, and is used in such a manner that data and a program are stored and set up therein when the CPU 39 executes the program.

The storage device (a second copy data storage unit, external storage) 31 is storage, such as an HDD or SSD, and stores various data and programs. A second copy data table 131 is stored in the storage device 31.

The second copy data table 131 is backup data in which a first copy data table 121 described later is copied, and has a configuration similar to that of the first copy data table 121. That is, the second copy data table 131 is configured such that addresses of a storage area in the SSD 20 described later and data (write data) to be stored at the addresses are associated with each other.

Figure 2:
FIG. 2 illustrates an example of a first copy data table and a second copy data table in the computer system as the exemplary embodiment.

FIG. 2 illustrates an example of the first copy data table 121 and the second copy data table 131 in the computer system 1 as the exemplary embodiment. In the example illustrated in FIG. 2, LBA addresses and write data are associated with other in the second copy data table 131 (the first copy data table 121).

The LBA address is an address in logical block addressing (LBA) and indicates the position in a storage area 22 of the SSD 20. The data is copies (the first copy data, the second copy data) of write data to be recorded on the SSD 20, and is dealt with as data blocks.

That is, the second copy data table 131 associates the address of the storage area in the SSD 20 with the data (write data; the second copy data) to be stored at that address.

A copy of the first copy data table 121 stored in the RAM 12 is transmitted to the computer 30 by a duplicate unit 114 of the computer 10 described later. Then, this copy of the first copy data table 121 is stored as the second copy data table (the second copy data) 131 in the storage area of the storage device 31. That is, the storage device 31 functions as a second copy data storage unit (backup disk) in which the second copy data table 131, which is backup data of the first copy data table 121, is stored.

The CPU 39 is a processing device for performing various control operations and arithmetic operations, and implements various functions by executing the OS and programs stored in the ROM 33. That is, the CPU 39 functions as a restoration unit 116, as illustrated in FIG. 1.

In the computer 10, the restoration unit 116 recovers data of the SSD 20 with which a fault has occurred and which has transitioned to the read-only mode and creates recovery image data, as described later.

For example, the SSD 20 that has transitioned to the read-only mode is removed from the computer 10, and the removed SSD 20 is transported, using transportation resources, to a location at which the computer 30 is set up and is connected to the I/O control unit 34 of the computer 30. Thus, the data of the SSD 20 that has transitioned to the read-only mode is read and is moved to the computer 30.

Note that, the data of the SSD 20 may be moved in such a way that the CPU (storage data transmission unit) 11 of the computer 10 reads all the data from the storage area 22 of the SSD 20, and transmits it to the computer 30 via the network 50, for example. In this case, the data of the SSD 20 may be automatically moved at a timing such as when the SSD 20 transitions to the read-only mode, or may be moved by an operator's action.

The data transmission speed of the network 50 is improving day by day regardless of whether the network 50 is wireless or wired, and it is expected that the data transmission speed will be more highly efficient in the future. Accordingly, even when the capacity of the SSD 20 will increase as a result of future technical innovations, there is no difficulty in carrying out transmission of all the data of the SSD 20 to the computer 30 via the network 50.

The restoration unit 116 creates restoration data (recovery image data) of the data of the SSD 20 by combining data read from the SSD 20, which has transitioned to the read-only mode, by a controller 21 with data of the second copy data table 131.

At this point, the restoration unit 116 uses data registered in the second copy data table 131 in preference to data read from the storage area 22 of the SSD 20. That is, among the data read from the storage area 22 of the SSD 20, data of an address registered at the LBA address of the second copy data table 131 is overwritten with data of the second copy data table 131.

Then, the restoration unit 116 stores the restored data of the SSD 20 in the newly prepared SSD 20 without a fault, for example, thereby restoring the SSD 20. Alternatively, the restoration unit 116 stores the recovery image data of the restored SSD 20 in a storage device that is newly prepared in the computer 30.

The computer 10 includes the CPU 11, the RAM 12, the ROM 13, an I/O control unit 14, a communication unit 15, the keyboard 16, the mouse 17, the display 18, and the SSD 20 as illustrated in FIG. 1.

The communication unit 15, which is a device that communicatively connects the computer 10 to the network 50, is a communication adapter, such as a LAN board, for example, and has a functional configuration similar to that of the communication unit 35.

The I/O control unit 14 is an interface device for controlling passing of data to and from an input/output device. In the example illustrated in FIG. 1, the I/O control unit 14 particularly controls the input and output of data to and from the SSD 20.

The SSD 20 is storage having a semiconductor memory such as a flash memory as the storage medium 22. The SSD 20 includes the controller (SSD controller) 21, the storage medium 22, and a cache memory 23, as illustrated in FIG. 1.

The storage medium 22 is a semiconductor memory, such as a flash memory, and stores data in a readable and writable manner.

The cache memory 23 is memory that temporarily stores data to be written in the storage medium 22 and data read from the storage medium 22. For example, the SSD 20 once stores the received data in this cache 23, and then writes it to the storage medium 22.

The controller 21 controls the writing and reading of data to and from the storage medium 22. When the CPU 11 performs data access to the storage medium 22 of the SSD 20, reading and writing are requested using an ATA command, for example. The controller 21 performs various data accesses to the storage medium 22 in conformity with a command transmitted from the CPU 11.

The controller 21 implements a self-diagnostic function in the SSD 20. For example, the controller 21 uses S.M.A.R.T. as the self-diagnostic function. The controller 21 measures the rate of occurrence of read errors and reading-and-writing speed during data access to the storage medium 22, and the total conduction time since shipment, and other conditions. The results of measurement are notified as S.M.A.R.T. values (self-diagnostic history information) to the CPU 11.

FIG. 3 illustrates S.M.A.R.T. values. In this FIG. 3, some of the fields of vendor-specific values in S.M.A.R.T. are illustrated. That is, "ATTRIBUTE_NAME", "FLAG", "VALUE", "WORST", "THRESH", "TYPE", "UPDATED", "WHEN_FAILED", and "RAW_VALUE" are included for each of a plurality of types of inspection items (attributes) denoted by "ID#".

For example, Raw_Read_Error_Rate of ID=01 represents the rate of errors that have occurred when data is read from a storage device (the SSD 20). When the numerical value is lower than a threshold, the storage medium 22 of the SSD 20 has an abnormality. Multi_Zone_Error_Rate of ID=200 represents the total number of errors discovered during writing of data.

For each inspection item, the "current value (VALUE)", a "threshold THRESH)", and the "worst value (WORST)" are set, for example.

Furthermore, the controller 21 performs control such that write access to the storage medium 22 is prohibited and read access to the storage medium 22 is permitted. That is, the SSD 20 is a storage device operable in the read-only mode.

Note that the self-diagnostic function and a function for implementing the read-only mode in the SSD 20 may be implemented using known various techniques, and the detailed explanation thereof is omitted.

Note that, since the SSD 20 does not have such a disk as in an HDD, it takes neither time for moving a read device (head) on a disk (seek time) nor waiting time until target data rotates to the position of a head (search time), allowing data to be read and written at high speed. The SSD 20 also has small power consumption since a motor may be unnecessary, and has a property of being resistant to impact since parts for mechanical driving are not used.

The ROM 13 is memory that stores an OS and programs executed by the CPU 11, various data, and the like.

The RAM 12 is main memory that stores various data and programs, and is used in such a manner that data and a program are stored and set up therein when the CPU 11 executes the program. The first copy data table 121 is stored in the RAM 12.

The first copy data table 121 associates addresses of the storage area in the SSD 20 with duplicates (first copy data) of data (write data) to be stored at the addresses, as described above.

In this way, the copy of data stored in the SSD 20 is stored in the storage area of the RAM 12. That is, the RAM 12 functions as a first copy storage unit that stores first copy data.

Note that although, in this embodiment, the addresses in the storage area 22 of the SSD 20 and the copy of data to be stored at the addresses are registered in the first copy data table 121 or second copy data table 131 in the form of a table so as to be associated with each other, the embodiment is not limited to this and may be carried out in various modified forms.

The CPU 11 is a processing device for performing various control operations and arithmetic operations, and implements various functions by executing the OS and programs stored in the ROM 13. That is, the CPU 11 functions as an I/O processing unit 111, a monitoring unit 112, a copy I/O processing unit 113, and the duplicate unit 114, as illustrated in FIG. 1.

The I/O processing unit 111 performs data access for read access or write access to the SSD 20, and performs various data access processing. For example, the I/O processing unit 111 stores results of arithmetic operations performed by the CPU 11 in the storage area 22 of the SSD 20, and reads data, programs, and the like to be used by the CPU 11 from the storage area 22 of the SSD 20.

That is, the I/O processing unit 111 functions as a write processing unit for writing data (write data) to the storage area 22 of the SSD 20.

The monitoring unit (sign detection unit) 112 detects a sign of a fault in the SSD 20. Specifically, the monitoring unit 112 detects a sign of a fault in the SSD 20 using at least some of the S.M.A.R.T. values (self-diagnostic history information) notified by the controller 21 of the SSD 20, for example.

Specifically, when detecting that the current value or the worst value is an abnormal value in at least some of the attributes in the S.M.A.R.T. values, the monitoring unit 112 detects a sign of a fault of the SSD 20.

The abnormal value in the S.M.A.R.T. values as used here means that the value is more than or less than a THRESHOLD value (a threshold) meant in the S.M.A.R.T. values, for example. That is, when any value of the S.M.A.R.T. values exceeds the threshold, it is determined that the S.M.A.R.T. value is an abnormal value. Hereinafter, a state where any of the S.M.A.R.T. values exceeds the THRESHOLD value may be called an S.M.A.R.T. abnormality.

For example, the monitoring unit 112 detects a sign of a fault of the SSD 20 by comparing the value of an attribute that is highly likely to change in light of experience, such as Raw_Read_Error_Rate or Multi_Zone_Error_Rate, in the S.M.A.R.T. values with a predetermined threshold.

Although, in the explanation mentioned above, the example using the THRESHOLD value of S.M.A.R.T. is noted as a technique for detecting an S.M.A.R.T. abnormality, the present disclosure is not limited to this. That is, for example, the threshold may be set to a value having a margin from the THRESHOLD value for safety reasons. Furthermore, the S.M.A.R.T. abnormality may be detected using an original threshold based on empirical rules by statistically analyzing the S.M.A.R.T. values at the time of occurrence of a fault.

The monitoring unit 112 may also detect a sign of a fault in the SSD 20 by detecting the number of errors of writing to the storage area 22 of the SSD 20, or by detecting a decrease in speed of reading or writing thereto. The number of writing errors is the number of writing errors that successively occur when data is written to the SSD 20, for example. When writing errors occur successively such that the number of writing is equal to or larger than a predetermined value, the SSD 20 is determined to be abnormal.

The decrease in speed of reading or writing means that the speed of writing data to the storage area 22 of the SSD 20 or the speed of reading data from the storage area 22 falls below a normal value. In such a case, the SSD 20 is determined to be abnormal.

The technique for detecting a sign of a fault in the SSD 20 is not limited to the aforementioned one, and may be carried out in various modified forms. That is, other techniques different from the aforementioned technique may be used, and the determination may be made by selecting some techniques and combining them as appropriate.

Note that detection of a sign of a fault in the SSD 20 performed by the monitoring unit 112 is not limited to these techniques, techniques other than these techniques, and the techniques may be carried out in various modified forms. The monitoring unit 112 may carry out these various techniques for detecting a sign of a fault in the SSD 20 by selectively combining these techniques as appropriate.

The monitoring unit (fault detection unit) 112 compares data stored in the RAM 12 to data corresponding thereto and being read from the SSD 20 to check whether data is correctly written in the SSD 20. Specifically, the monitoring unit 112 reads, from the SSD 20, data corresponding to an LBA address stored in the first copy data table 121 of the RAM 12 described later.

Then, the monitoring unit 112 compares the data stored in the first copy data table 121 to the data read from an address corresponding to the LBA address of the SSD 20, and determines whether the stored data matches the read data.

If the data stored in the first copy data tables 121 does not match the data read from the SSD 20, the monitoring unit 112 determines that a fault has occurred in the SSD 20.

For example, when reading data from the SSD 20, the monitoring unit 112 refers to the first copy data table 121 on the basis of the address (designation address) of data to be read (read data) in the SSD 20. Then, if the designation address of read data is registered in the first copy data table 121, the monitoring unit 112 compares the read data from the SSD 20 to the first copy data corresponding to that designation address and being read from the first copy data table 121.

When the read data from the SSD 20 does not match the first copy data read from the first copy data table 121, the monitoring unit 112 detects that a fault has occurred in the SSD 20. That is, the monitoring unit 112 has also a function as a fault detection unit that detects occurrence of a fault in the SSD 20.

Note that the technique for detecting occurrence of a fault in the SSD 20 is not limited to this, and may be carried out in modified forms as appropriate.

Upon detecting the occurrence of a fault in the SSD 20, the monitoring unit 112 outputs a retract notification to the duplicate unit 114.

Note that, upon receiving the retract notification, the duplicate unit 114 transmits a copy of the first copy data table 121 to the computer 30 so as to cause the copy to be saved as the second copy data table 131 in the storage device 31 of the computer 30.

The monitoring unit 112 outputs a notification to the effect that some fault has occurred in the SSD 20 and a notification to the effect that write data has failed to be written (write failure notification).

The monitoring unit 112 notifies an operator of the computer 10 by causing a message to the effect that writing of write data to the SSD 20 has failed to be displayed on the display 18 or outputting a warning beep from a speaker, which is not illustrated. This enables the operator to recognize that writing of write data has failed, thereby allowing desired measures to be taken. For example, data of which writing has been completed is retracted from the SSD 20, or write data is written again.

If write data is not able to be stored in the storage area 22 in the SSD 20 for some reason, the SSD 20 outputs, to the CPU 11, an abnormality response to the effect that write data is not able to be stored.

Upon detecting that writing of write data to the SSD 20 has failed, the monitoring unit 112 also notifies the SSD 20 of the occurrence of some fault, and notifies the SSD 20 of a failure to write the write data (write failure notification).

In addition, in the case where the monitoring unit 112 is not notified of an abnormality response from the SSD 20 even if a predetermined time (e.g., 2 or 3 minutes) has passed since storing of write data in the SSD 20 performed by the I/O processing unit 111, the monitoring unit 112 determines that write data has been successfully written to the SSD 20.

Furthermore, in the case of new data where the predetermined time has not yet passed since storing of data in the SSD 20, the monitoring unit 112 compares the read data from the SSD 20 to the first copy data read from the first copy data table 121. Then, if the read data from the SSD 20 matches the first copy data read from the first copy data table 121, the monitoring unit 112 determines that write data has been successfully written to the SSD 20.

Otherwise, if the read data from the SSD 20 does not match the first copy data read from the first copy data table 121, the monitoring unit 112 determines that write data has failed to be written to the SSD 20.

When the monitoring unit (sign detection unit) 112 detects a sign of a fault in the SSD 20, the copy I/O processing unit (first copy unit) 113, instead of the I/O processing unit 111, reads and writes data from the SSD 20.

The copy I/O processing unit 113 writes data (write data) to the SSD 20 and stores, in the RAM 12, a copy (first copy data) of the write data written to the storage area 22 of the SSD 20.

In this computer system 1, the copy I/O processing unit 113 stores a copy of the write data to the SSD 20 in the first copy data table 121 of the RAM 12. On this occasion, the copy I/O processing unit 113 stores a copy of write data in the first copy data table 121 in such a manner that the copy of write data is associated with the address of a storage location in the SSD 20 of the write data.

In this way, the copy I/O processing unit 113 writes write data to both the SSD 20 and the RAM 12.

When the aforementioned monitoring unit 112 determines that writing of write data to the SSD 20 has succeeded, the copy I/O processing unit 113 deletes first copy data corresponding to that write data from the first copy data table 121 of the RAM 12. This increases the available space of the RAM 12.

There may be cases where when the copy I/O processing unit 113 stores the first copy data in the RAM 12, write data is not able to be stored in the RAM 12. In such cases, the copy I/O processing unit 113 strives to secure available memory, for example, by deleting, from the RAM 12, the first copy data in the RAM 12 whose corresponding write data has successfully written to the SSD 20.

Note that when the size of the first copy data is larger than the available space of the RAM 12, that first copy data is not able to be stored in the RAM 12. In this case, the copy I/O processing unit 113 outputs a notification to the effect that the first copy data is not able to be stored in the RAM 12. For example, a message to the effect that the first copy data is not able to be stored in the RAM 12 is output to the display 18, thereby notifying an operator of the computer 10.

When a fault has occurred in the SSD 20, the copy I/O processing unit 113 outputs first copy data read from the first copy data table 121, as read data in the form of a response.

Upon receiving a retract notification from the monitoring unit (fault detection unit) 112, the duplicate unit (second copy unit) 114 saves a copy of the first copy data table 121 stored in the RAM 12, as the second copy data table 131, in the storage device 31 of the computer 30.

That is, the duplicate unit 114 saves a backup of the first copy data table 121, which is stored in the storage area 22, in the storage device 31 of the computer 30 when the monitoring unit 112 detects occurrence of a fault in the SSD 20.

The CPU 11 of the computer 10 functions as the aforementioned I/O processing unit 111, monitoring unit 112, and copy I/O processing unit 113 by executing a program (e.g., a device program). The CPU 11 of the computer 10 also functions as the aforementioned duplicate unit 114 by executing a program (e.g., a processing program).

Also, the CPU 39 of the computer 30 functions as the aforementioned restoration unit 116 by executing a program (e.g., a processing program).

Note that programs (device program, control program) for implementing functions as the I/O processing unit 111, monitoring unit 112, copy I/O processing unit 113, duplicate unit 114, and restoration unit 116 are provided in the form recorded on a computer-readable recording medium, such as a flexible disk, compact disk (CD) (CD-ROM, CD-R, CD-RW, or the like), digital versatile disk (DVD) (DVD-ROM, DVD-RAM, DVD-R, DVD+R, DVD-RW, DVD+RW, HD DVD, or the like), Blu-ray disc, magnetic disk, optical disk, or magneto-optical disk. Then, a computer reads a program from the recording medium, and transfers and stores the program in internal memory or external memory and uses it. The program may be recorded, for example, on memory (recording medium), such as a magnetic disk, an optical disk, or a magneto-optical disk, and may be provided from the memory through a communication path to a computer.

At the time of implementation of functions of the I/O processing unit 111, monitoring unit 112, copy I/O processing unit 113, duplicate unit 114, and restoration unit 116, programs stored in internal memory (the RAMs 12 and 32 and the ROMs 13 and 33 in this embodiment) are executed by a microprocessor (the CPUs 11 and 39 in this embodiment) of a computer. At this time, a computer may read and execute a program recorded on a recording medium.

Note that, in this embodiment, a computer is a concept containing hardware and an operating system, and means hardware that operates under control of an operating system. Additionally, in cases where an operating system may be unnecessary and hardware operates with an application program alone, the hardware itself corresponds to a computer. Hardware at least includes a microprocessor, such as a CPU, and a measure for reading a computer program recorded on a recording medium.

Figure 4:
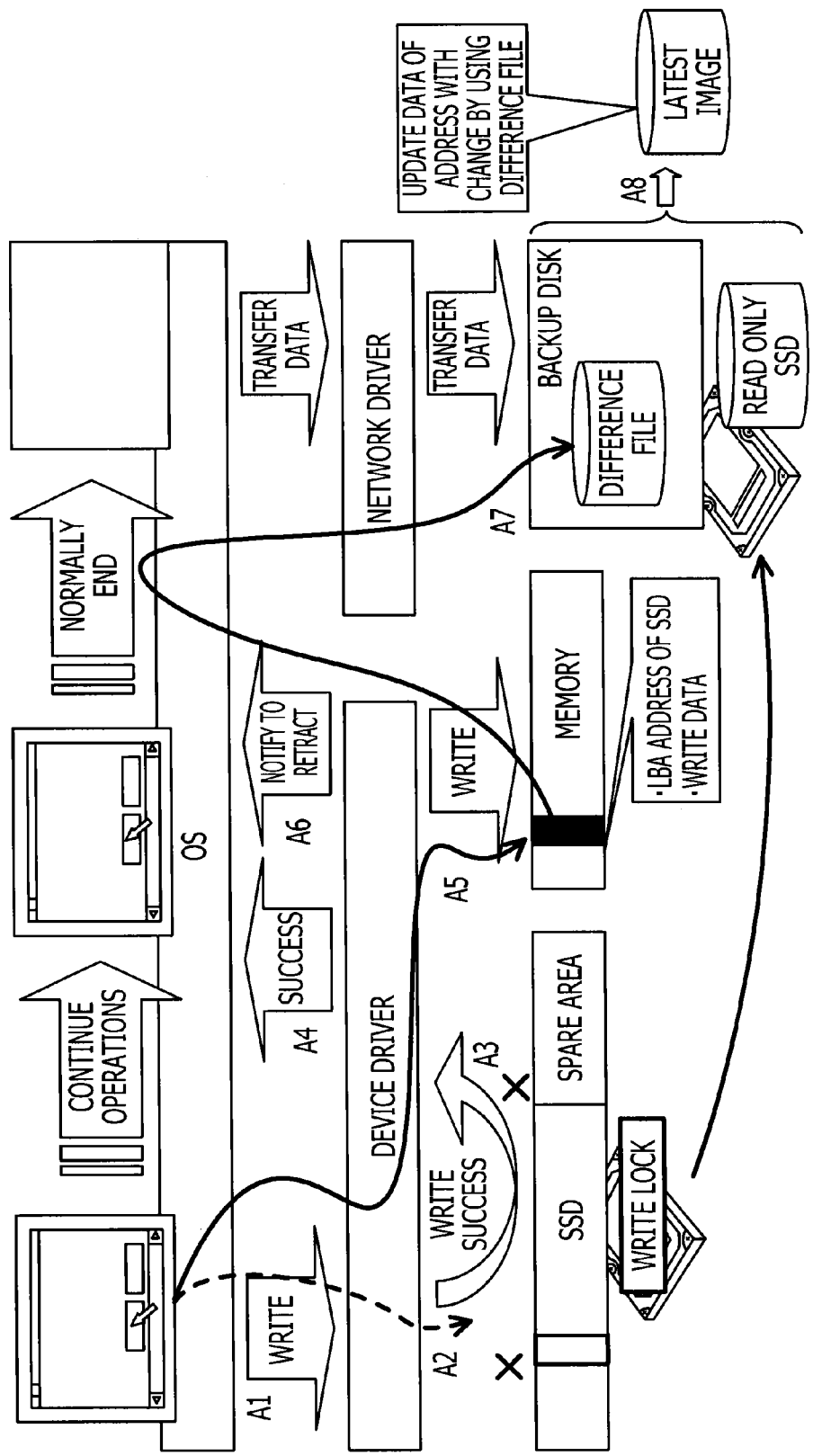
FIG. 4 depicts an overview of a data flow in the computer system as the exemplary embodiment.

The overview of a data flow in the computer system 1 as the exemplary embodiment configured as described above will be described with reference to FIG. 4.

For example, an instruction for saving data (write data) is given in an application that runs on an OS. Write data is passed from the application through the OS to a device driver (refer to arrow A1).

The device driver (the I/O processing unit 111) causes the SSD 20 to perform writing of data, and the controller 21 of the SSD 20 stores the write data in the storage area 22 via the cache 23 (refer to arrow A2). The controller 21 notifies the disk driver of a response of completion of writing (write success) of data at the time when writing of data to the cache 23 is completed (refer to arrow A3). The device driver provides a response of completion (Success) of writing of data to the OS (refer to arrow A4).

However, even when the controller 21 transmits a response of completion of writing to the device driver, writing of write data in the storage area 22 may fail in the SSD 20.

Additionally, the disk driver (the monitoring unit 112) monitors the state of the SSD 20, and determines whether there is a sign (e.g., S.M.A.R.T. abnormality, a writing error, a decrease in speed of reading or writing) of a fault. When the sign of a fault is detected, the copy I/O processing unit 113 stores a copy of write data to be written to the storage area 22 of the SSD 20 as the first copy data table 121 in the RAM 12 in such a manner that the copy of the write data is associated with write addresses in the SSD 20 (refer to arrow A5).

Additionally, during read access to the SSD, when the monitoring unit 112 detects occurrence of a fault in the SSD 20, the disk driver (the monitoring unit 112) provides a retract notification to a control program via the OS (refer to arrow A6). The controller 21 of the SSD 20 causes the storage area 22 to transition to the read-only mode.

The duplicate unit 114 stores a copy of the first copy data table 121 of the RAM 12 as the second copy data table 131 in the storage device 31 of the computer 30 (refer to arrow A7).

That is, data obtained by copying the first copy data table 121 transmitted from the computer 10 is transmitted to the computer 30 via the network 50. In the computer 30, copy data of the first copy data table 121 is transferred through a network driver to the storage device 31 and is stored as the second copy data table 131.

Thereafter, the SSD 20, which has been in the read-only mode, is connected to the computer 30. In the computer 30, the restoration unit 116 combines the data read from the SSD 20 with the second copy data table 131 stored in the storage device 31. Thus, the data of the SSD 20 is restored (refer to arrow A8).

Figure 5:
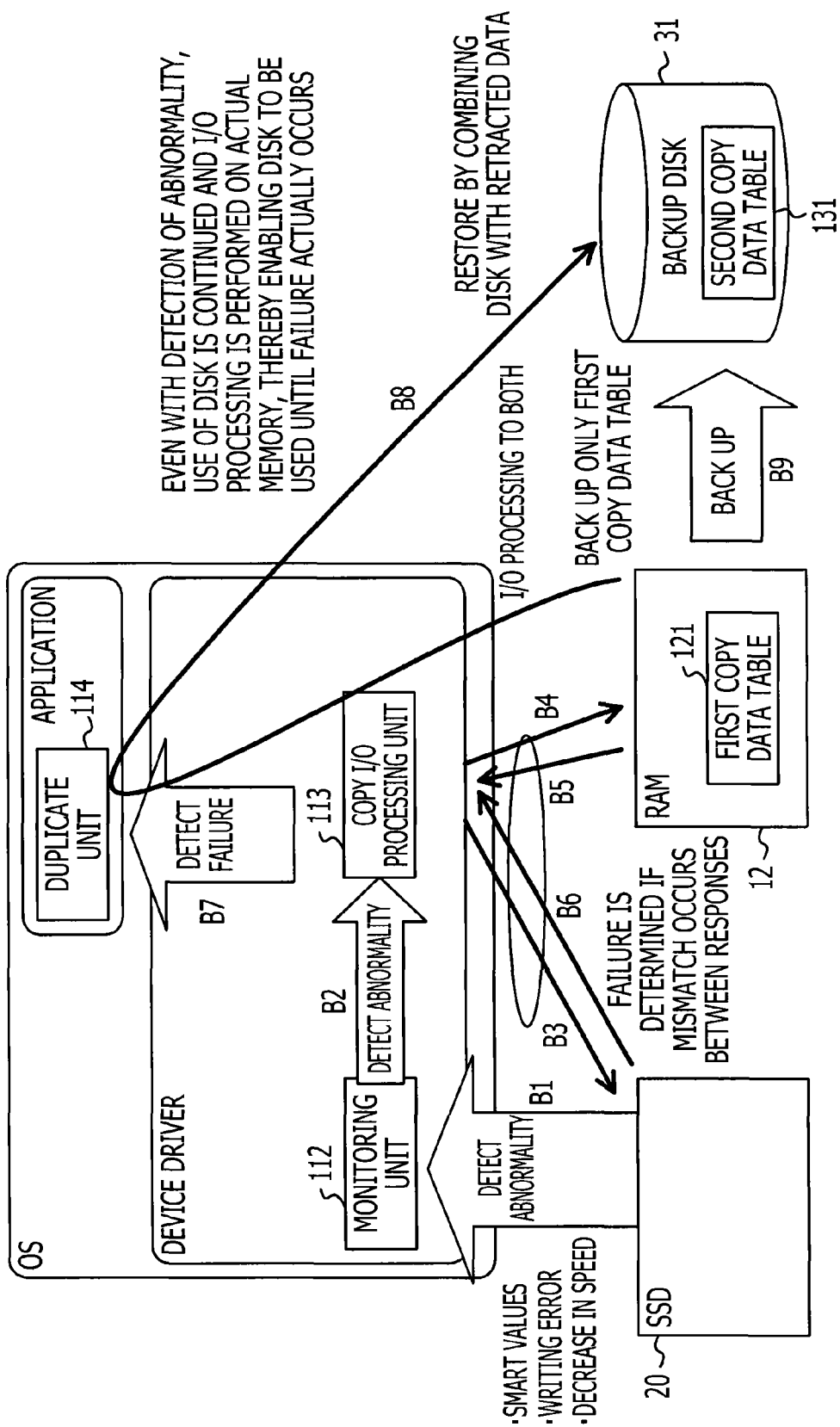
FIG. 5 illustrates processing performed when an abnormality is detected in the computer system as the exemplary embodiment.

FIG. 5 illustrates processing performed when an abnormality is detected in the computer system 1 as the exemplary embodiment.

The controller 21 of the SSD 20 notifies the device driver (the monitoring unit 112) of S.M.A.R.T. values, occurrence of a write error, and the speed of reading or writing at predetermined intervals or a predetermined timing. The monitoring unit 112 detects a sign of a fault of the SSD 20 on the basis of these pieces of information notified from the controller 21 (refer to arrow B1).

In the device driver, upon detecting a sign of a fault, the monitoring unit 112 notifies the copy I/O processing unit 113 of detection of an abnormality (refer to arrow B2]). The copy I/O processing unit 113 writes write data to the SSD 20 (refer to arrow B3) and stores, in the RAM 12, a copy of the write data to be written to the storage area 22 of the SSD 20 (refer to arrow B4). Note that writing of write data to the RAM 12 is performed in the first copy data table 121 such that the write data is associated with a write address (LBA address) in the SSD 20.

In this way, when the monitoring unit 112 detects a sign of a fault of the SSD 20, the copy I/O processing unit 113 writes write data to both the SSD 20 and the RAM 12.

Additionally, during read access to the SSD, the copy I/O processing unit 113 compares read data from the SSD 20 with first copy data read from the first copy data table 121 (refer to arrows B5 and B6). If the read data from the SSD 20 does not match the first copy data read from the first copy data table 121, the monitoring unit 112 determines that a fault has occurred in the SSD 20.

Upon detecting the occurrence of a fault in the SSD 20, the monitoring unit 112 notifies the duplicate unit 114 of the fact (refer to arrow B7).

The duplicate unit 114 stores a copy of the first copy data table 121 of the RAM 12 in the storage device 31 of the computer 30 (refer to arrow B8).

Thereby, a backup of the first copy data table 121 is stored as the second copy data table 131 in the storage device 31 of the computer 30 (refer to arrow B9).

Then, the restoration unit 116 combines data read from the SSD 20 with the second copy data table 131 stored in the storage device 31. Thus, the data of the SSD 20 is restored. The restored data of the SSD 20 is stored in newly prepared storage, such as an SSD, for example.

Figure 6:
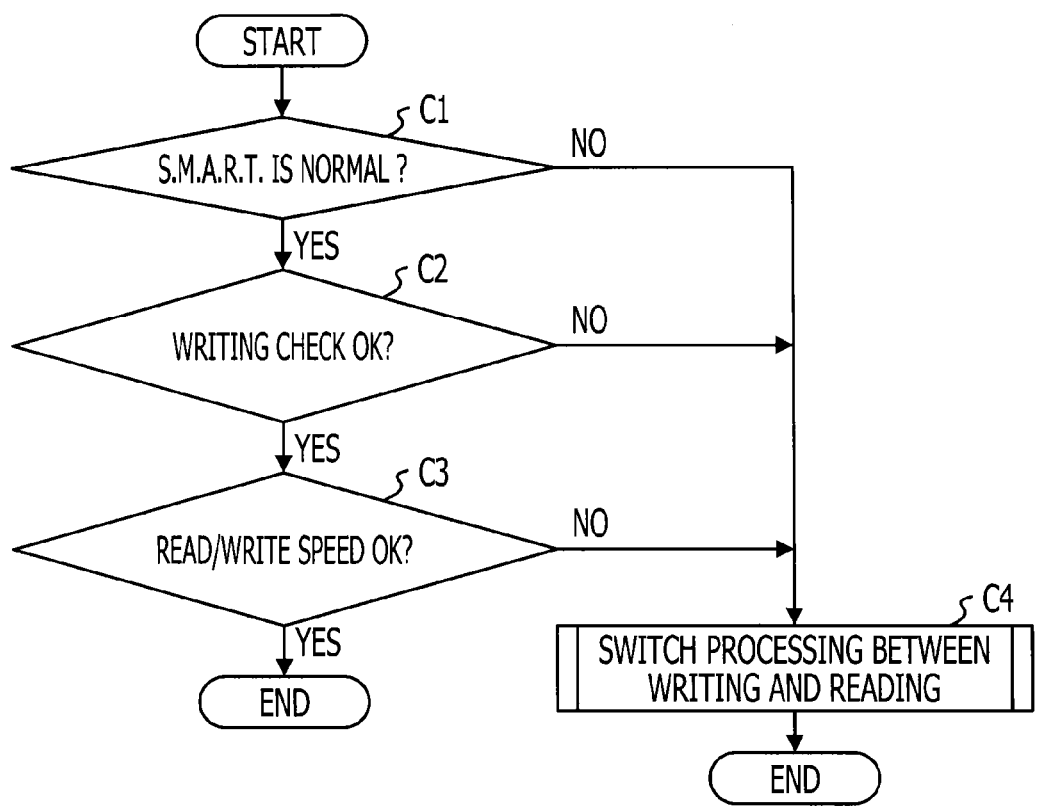
FIG. 6 is a flowchart illustrating a technique for detecting a sign of a fault of an SSD in the computer systems as the exemplary embodiment.

Then, in accordance with the flowchart (steps C1 to C4) of FIG. 6, a technique for detecting a sign of a fault of the SSD 20 in the computer system 1 as the exemplary embodiment will be described.

The monitoring unit 112 determines whether an S.M.A.R.T. value notified from the controller 21 of the SSD 20 is normal (step C1). For example, if the S.M.A.R.T. value is not normal, such as the case where the S.M.A.R.T. value exceeds a threshold set in advance (refer to the NO route of step C1), the copy I/O processing unit 113, instead of the I/O processing unit 111, reads and writes data to the SSD 20 (step C4). Note that details of processing performed by the copy I/O processing unit 113 are described later in accordance with flowcharts illustrated in FIG. 7 and FIG. 8.

If the S.M.A.R.T. value is normal (refer to the YES route of step C1), then the monitoring unit 112 determines whether writing of data to the SSD 20 has been correctly performed (step C2).

For example, after writing of data to the storage area 22 of the SSD 20, the controller 21 of the SSD 20 reads the written data and compares it with intended data, thereby checking whether data has reliably been written.

For example, the checksum of data to be written is compared with the checksum of data read from the SSD 20, and it is verified whether these checksums match. The result of verification is notified to the monitoring unit 112, and, on the basis of this notification, the monitoring unit 112 determines whether data has been correctly written to the SSD 20.

If writing of data has not been correctly performed (refer to the NO route of step C2), then the process proceeds to step C4.

If data has been correctly written to the SSD 20, (refer to the YES route of step C2), then the monitoring unit 112 determines whether there is a decrease in the speed of reading or writing data to the SSD 20 (step C3).

The controller 21 of the SSD 20 measures write speed at which data is written to the storage area 22 of the SSD 20 or read speed at which data is read from the storage area 22. The measurement result is notified to the monitoring unit 112, and, on the basis of this notification, the monitoring unit 112 determines a decrease in speed of reading or writing data to the SSD 20.

The decrease in read speed or write speed is determined by comparing the measured read speed or write speed with a threshold set in advance, for example. Additionally, the measured reed speed or write speed may be compared with read speed or write speed previously measured, and when a difference between them exceeds a predetermined threshold, it may be determined that a decrease in read speed or write speed has occurred. The way for determination of a decrease in speed may be carried out in various modified forms.

If a decrease in write speed or read speed of data has occurred (refer to the NO route of step C3), then the process proceeds to step C4. Otherwise, if a decrease in write speed or read speed of data has not occurred (refer to the YES route of step C3), then detection of the sign of a fault ends.

Note that the order of processing of steps C1 to C3 mentioned above is not limited to this, and may be changed appropriately and performed.

Figure 7:
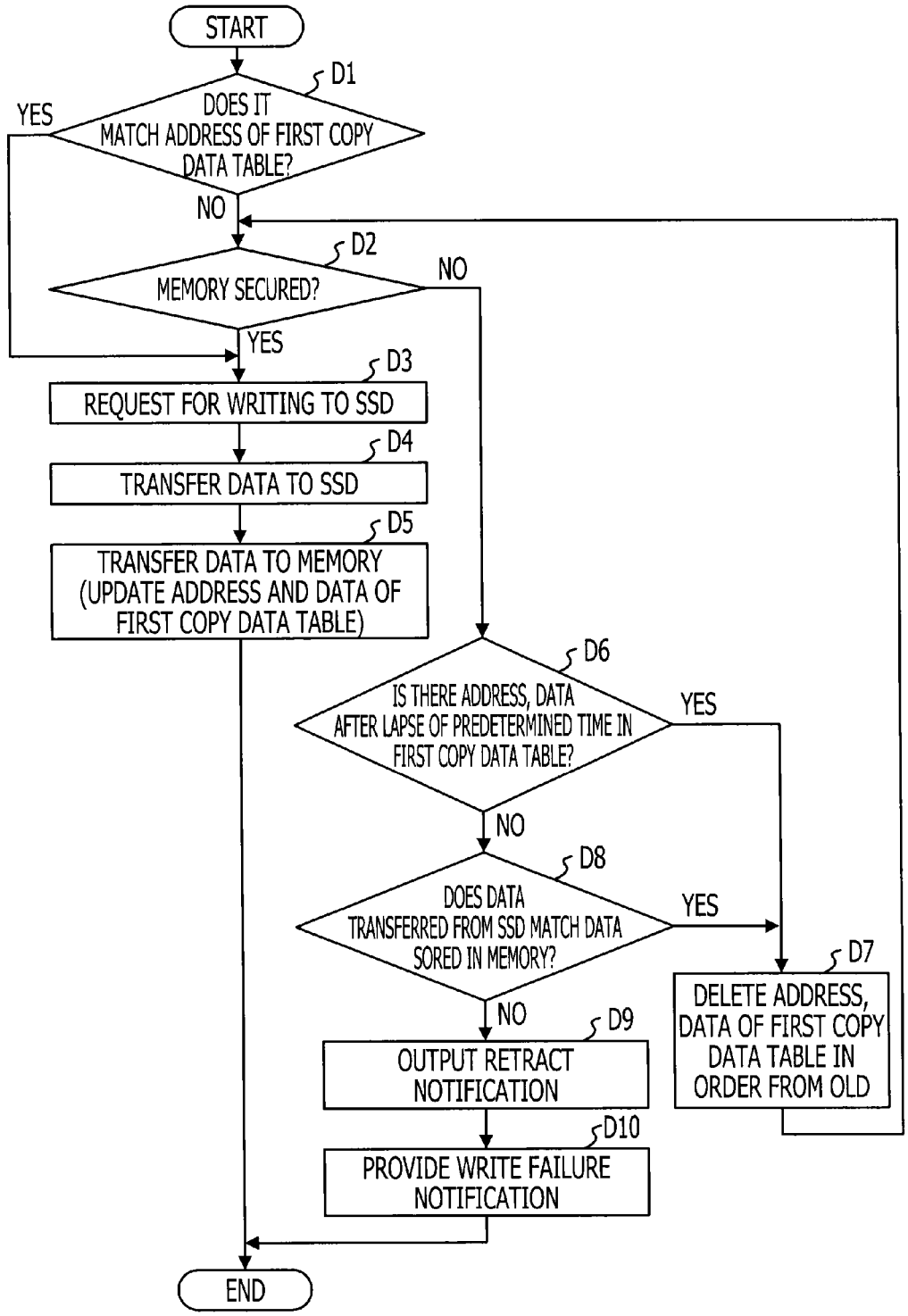
FIG. 7 is a flowchart illustrating processing of writing of data by a copy I/O processing unit in the computer system as the exemplary embodiment.

Then, in accordance with the flowchart (steps D1 to D10) illustrated in FIG. 7, processing at the time of data writing performed by the copy I/O processing unit 113 in the computer system 1 as the exemplary embodiment will be described next.

The copy I/O processing unit 113 checks whether the write address of write data in the SSD 20 matches the address registered at the LBA address of the first copy data table 121 (step D1). If the write address of write data is not registered at the LBA address of the first copy data table 121 (refer to the NO route of step D1), then the available space of the RAM 12 is checked on the basis of the data size of write data, and it is determined whether write data is able to be stored in the RAM 12 (step D2). If available space for storing write data is secured in the RAM 12 (refer to the YES route of step D2), the copy I/O processing unit 113 transmits a request for writing of write data to the controller 21 of the SSD 20 (step D3). The copy I/O processing unit 113 transfers write data to the SSD 20 (step D4).

The copy I/O processing unit 113 also transfers write data to the RAM 12. That is, the copy (the first copy data) of write data is transferred to the RAM 12, and the write data and its address in the SSD 20 are stored in such a manner as to be associated with an LBA address in the first copy data table 121. That is, the LBA address and the data of the first copy data table 121 are updated, and the process ends. In this way, the copy I/O processing unit 113 writes data to the SSD 20 while updating the first copy data table 121.

Otherwise, if the write address of write data matches an address registered at the LBA address of the first copy data table 121 (refer to the YES route of step D1), the process proceeds to step D3.

If available space for storing write data is not secured in the RAM 12 (refer to the NO route of step D2), the copy I/O processing unit 113 checks whether there is an entry (LBA address, data) for which a predetermined time (e.g., 2 or 3 minutes) has passed since the registration in the first copy data table 121 (step D6).

If the SSD 20 does not output an abnormal response in the predetermined time after writing of data to the storage area 22, it may be determined that the data has been successfully written. Accordingly, deleting the entry of the data in the first copy data table 121 enables available space of the RAM 12 to be increased.

If there is an entry for which the predetermined time has passed since the registration in the first copy data table 121 (refer to the YES route of step D6), the first copy data of the entry for which the given time has passed after deletion of registration in the order from old to new in the first copy data table 121 (step D7). Thereafter, the process returns to step D2 (refer to A in a circle in FIG. 7).

Otherwise, if there is not an entry for which the predetermined time has passed since the registration in the first copy data table 121 (refer to the NO route of step D6), the copy I/O processing unit 113 checks whether the data registered in the first copy data table 121 data has been successfully written to the SSD 20 (step D8). Deleting the successfully written data from the first copy data table 121 enables available space of the RAM 12 to be increased.

That is, for example, regarding one or more entries registered in the first copy data table 121, data at their LBA addresses is read from the SSD 20. Then, it is checked whether the data transferred from the SSD 20 matches data saved in the RAM 12 (the first copy data table 121).

If there is a match between the data transferred from the SSD 20 and the data saved in the RAM 12 (refer to the YES route of step D8), the process proceeds to step D7, where the first copy data that is determined to have been successfully written is deleted in the order from old to new in the first copy data table 121, and then the process returns to step D2.

If there is not a match between the data transferred from the SSD 20 and the data saved in the RAM 12 (refer to the NO route of step D8), the monitoring unit 112 outputs a retract notification (step D9).

This retract notification is input to the duplicate unit 114. Upon receiving the retract notification, the duplicate unit 114 transmits a copy of the first copy data table 121 of the RAM 12 to the computer 30 via the network 50 so as to cause the copy to be saved as the second copy data table 131 in the storage device 31.

The copy I/O processing unit 113 provides a notification to the effect that write data has failed to be written to the RAM 12 (step D10), and the process ends. In this case, owing to the restoration unit 116, it is possible to restore data before the data that has failed to be written.

Note that the order of processing of step D9 and D10 mentioned above is not limited to this, and processing of step D9 may be performed after processing of step D10.

Figure 8:
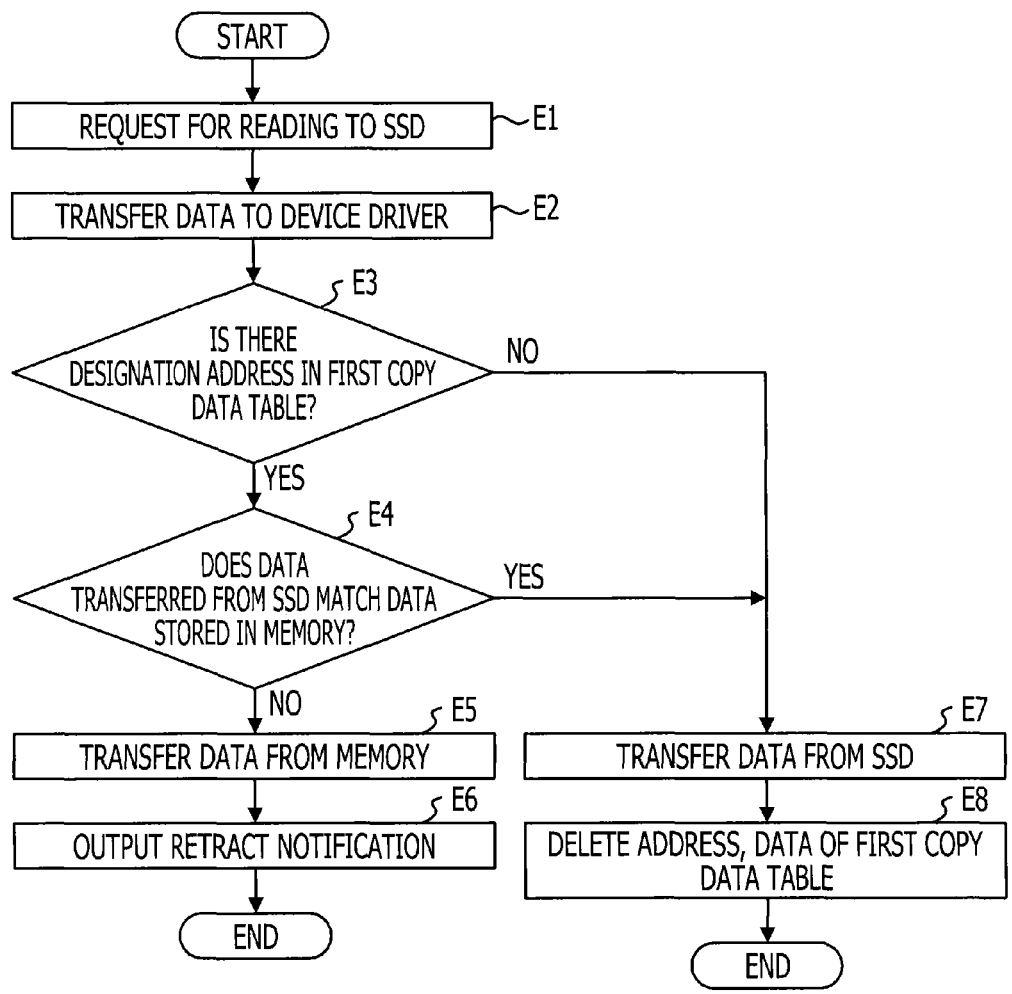
FIG. 8 is a flowchart illustrating processing of reading data by the copy I/O processing unit in the computer system as the exemplary embodiment.

Then, in accordance with the flowchart (steps E1 to E8) illustrated in FIG. 8, processing at the time of data reading performed by the copy I/O processing unit 113 in the computer system 1 as the exemplary embodiment will be described next.

When the copy I/O processing unit 113 notifies the SSD 20 of a request for reading (step E1), the SSD 20 transfers the target data to the device driver (the copy I/O processing unit 113) (step E2).

The copy I/O processing unit 113 checks whether the address in the SSD 20 of the read data to be read is registered at the LBA address of the first copy data table 121 (step E3).

If the address of the read data to be read is registered in the first copy data table 121 (refer to the YES route of step E3), it is determined whether the read data from the SSD 20 matches data read from the RAM 12 (the first copy data table 121) (step E4).

If the read data from the SSD 20 does not match the data read from the first copy data table 121 (refer to the NO route of step E4), the copy I/O processing unit 113 transfers the data read from the first copy data table 121 to the CPU 11 and the like (step E5). Also, the monitoring unit 112 outputs a retract notification (step E6), and the process ends.

This retract notification is input to the duplicate unit 114. Upon receiving the retract notification, the duplicate unit 114 transmits a copy of the first copy data table 121 of the RAM 12 to the computer 30 via the network 50 so as to cause the copy to be saved as the second copy data table 131 in the storage device 31.

Note that the order of processing of step E5 and E6 is not limited to this, and processing of step E5 may be performed after processing of step E6.

Otherwise, if the address of the read data to be read from the SSD 20 is not registered in the first copy data table 121 (refer to the NO route of step E3), the copy I/O processing unit 113 transfers the data read from the SSD 20 to the CPU 11 and the like (step E7). The copy I/O processing unit 113 deletes first copy data corresponding to the read data concerned from the first copy data table 121, and the process ends (step E8).

Also, if the read data from the SSD 20 matches the data read from the first copy data table 121 (refer to the YES route of step E4), the process proceeds to step E7.

Note that the order of processing of step E7 and E8 is not limited to this, and processing of step E7 may be performed after processing of step E8.

In this way, according to the computer system 1 as the exemplary embodiment, when the sign of a fault in the SSD 20 is detected, a copy of write data is stored in the first copy data table 121 of the RAM 12.

That is, in the computer system 1, even when occurrence of a fault of the SSD 20 has been detected and the SSD 20 has transitioned to the read-only mode, data for which a writing request to the SSD 20 is performed after the detection of a fault is stored in the RAM 12.

Thereby, even when the SSD 20 has transitioned to the read-only mode and therefore write data has not been able to be stored in the SSD 20, for example, a copy of write data from the RAM 12 is able to be read and used, and thus the reliability of data may be improved. By using the data of the SSD 20 read from the SSD 20 of the read-only mode and first copy data stored in the first copy data table 121, data in the SSD 20 that is suitable for a write instruction from an application or the like may be restored.

Also, by causing the SSD 20 to transition to the read-only mode at the time of occurrence of a fault, an additional fault of the storage area 22 may be inhibited from occurring.

When the monitoring unit 112 detects at least any of S.M.A.R.T. abnormalities, a writing error, and a decrease in speed of reading and writing, the monitoring unit 112 detects a sign of a fault of the SSD 20. Thereby, occurrence of a fault of the SSD 20 may be detected in advance, and write data may be backed up to the RAM 12. Thus, the reliability may be improved.

In cases where available space is insufficient in the RAM 12 when the copy I/O processing unit 113 stores a copy of write data in the RAM 12, the entry of data for which writing to the SSD 20 has been completed is deleted from the first copy data table 121. This enables a copy of write data to be stored in the RAM 12, and thus the reliability may be improved.

Also, when the monitoring unit 112 detects occurrence of a fault in the SSD 20, the duplicate unit 114 stores a copy of the first copy data table 121 of the RAM 12 in the storage device 31 of the computer 30. This enables the restoration unit 116 to restore the SSD 20 by using the second copy data table 131 of the storage device 31 in cases where the data of the RAM 12 is lost, such as a case of power-off of the computer 10, and thus the reliability may also be improved.

(B) Modification

In the foregoing embodiment, the monitoring unit 112 included in the computer 10 detects a sign of a fault in the SSD 20; however, the present disclosure is not limited to this.

In this modification, the computer 30 connected to the network 50 has a function as the monitoring unit 112*a*, and the monitoring unit 112*a* included in the computer 30 detects a sign of a fault in the SSD 20.

Figure 9:
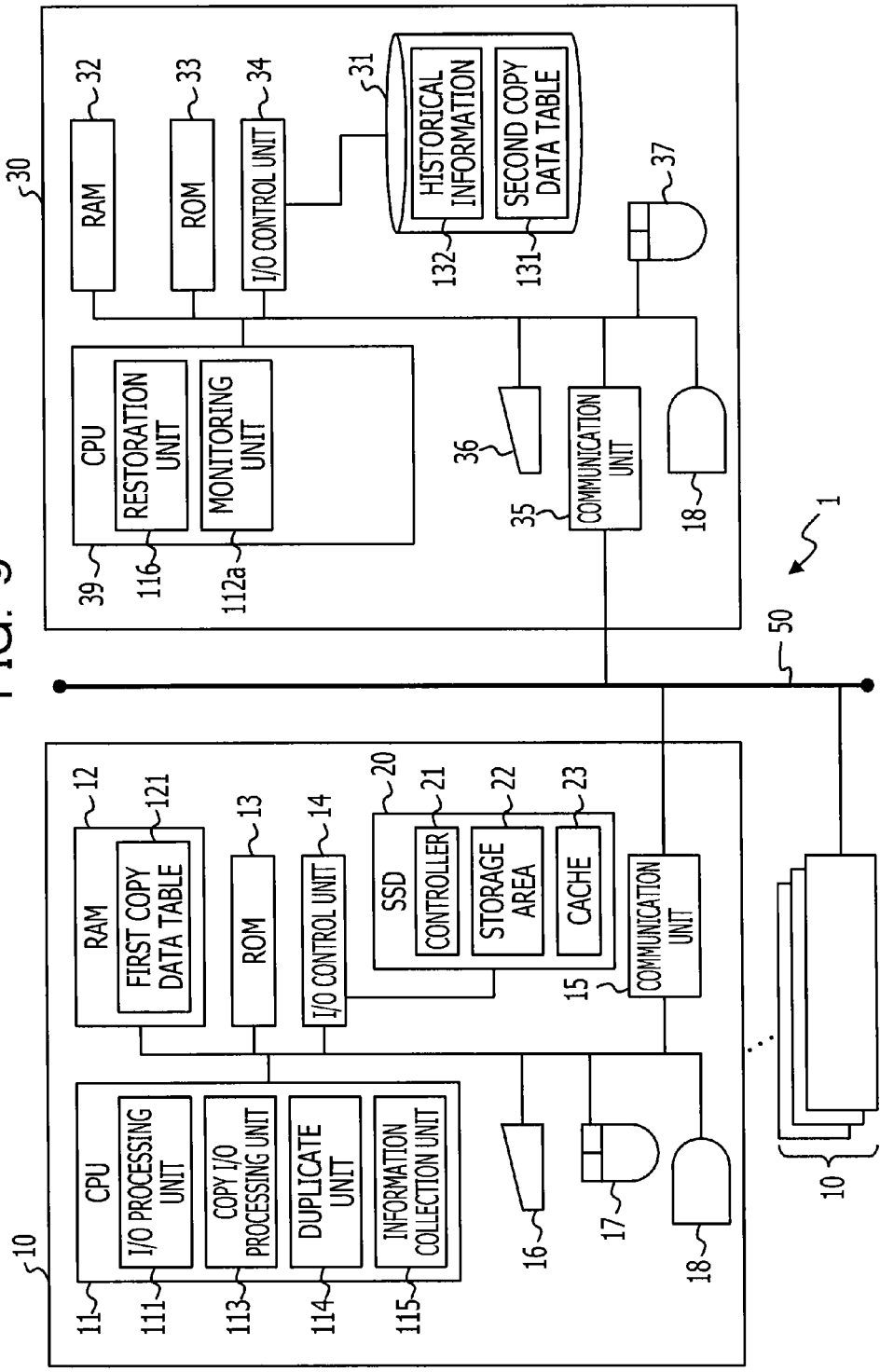
FIG. 9 is a block diagram illustrating a configuration of a modification of the computer system as the exemplary embodiment.

FIG. 9 is a block diagram illustrating a configuration of a modification of the computer system 1 as the exemplary embodiment.

The computer system 1 of this modification, as illustrated in FIG. 9, includes the computer 30 and one or more computers 10, and the computer 10 and the computer 30 are communicatively connected via the network 50.

Note that, in the drawing, the same reference characters as the foregoing reference characters refer to the same components, and the detailed description thereof is omitted.

In this modification, the computer 10 includes an information collection unit 115 instead of the monitoring unit 112 in the computer 10 of the embodiment.

The information collection unit 115 collects status records of the SSD 20 in the computer 10 and transmits it as log information to the computer 30.

The information collection unit 115 collects S.M.A.R.T. values and information indicating the presence of a fault in the SSD 20 from the SSD 20 at predetermined intervals, for example. The information collection unit 115 may transmit the number of errors of writing to the storage area 22 or the speed of reading or writing to the storage area 22, which are acquired from the controller 21 of the SSD 20, as log information to the computer 30.

The information collection unit 115 transmits the collected information on the SSD 20, as log information, together with the disk serial number of the SSD 20 and the PC ID of the computer 10 to the computer 30 via the network 50.

Note that the function as the information collection unit 115 is implemented by the CPU 11 executing an information collection program (information collection application; refer to FIG. 10) that operates on the OS, for example.

The computer 30 is configured as a server computer having a server function, and is arranged in cloud computing, for example.

Historical information 132, in addition to the second copy data table 131, is stored in the storage device 31.

The historical information 132 is operation records of the SSD 20 included in the computer 10, and contains information on a fault of the SSD 20. The historical information 132 is collected by the information collection unit 115 of the computer 10 described later, and is created on the basis of the transmitted log information.

Figure 10:
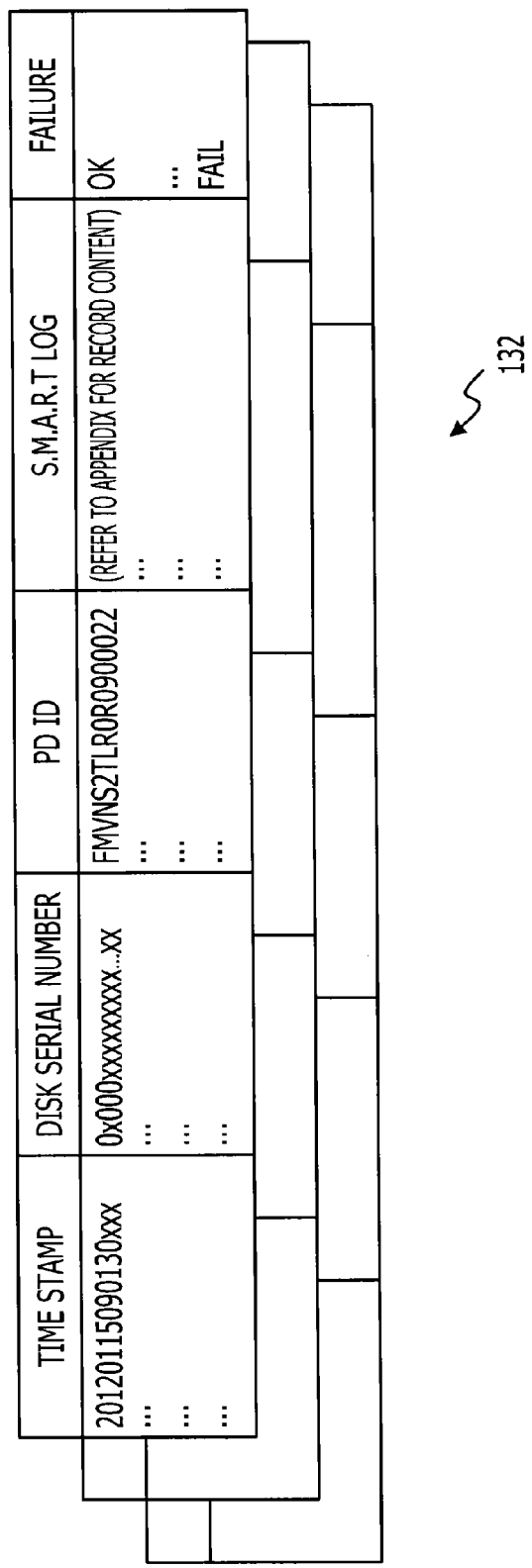
FIG. 10 illustrates historical information in the modification of the computer system as the exemplary embodiment.

FIG. 10 illustrates the historical information 132 in the modification of the computer system 1 as the exemplary embodiment.

In the example illustrated in this FIG. 10, the historical information 132 is configured such that items of Time Stamp, Disk Serial Number, PC ID, S.M.A.R.T. LOG, and Failure are mutually associated. Note that, in the example illustrated in FIG. 10, the historical information 132 is represented in the form of a table.

The historical information 132 is created for every disk model number of the SSD 20. The disk model number of the SSD 20 is identifying information for identifying the model of the SSD 20, and the same disk model number is set for the same type of the SSDs 20.

Time Stamp indicates a date and time at which the information has been collected by the information collection unit 115. Disk Serial Number is identifying information for identifying the SSD 20 and is set uniquely for each SSD 20. PC ID is identifying information for identifying the computer 10 in which the SSD 20 is installed.

S.M.A.R.T. LOG indicates S.M.A.R.T. values (refer to FIG. 3) generated by the controller 21 of the SSD 20, and the controller 21 generates the S.M.A.R.T. values once every predetermined time. Failure is information indicating the state of the SSD 20, and represents whether a fault has occurred in the SSD 20 at the time when the information representing the history of operations is collected. Accordingly, when the failure information is "Fail", the corresponding S.M.A.R.T.LOG indicates the S.M.A.R.T. values of the failed SSD 20, whereas when the failure information is "OK", the corresponding S.M.A.R.T.LOG indicates the S.M.A.R.T. values of the SSD 20 in the non-failed state.

The monitoring unit 112a detects a sign of a fault in the SSD 20 included in the computer 10. Specifically, the monitoring unit 112a detects a sign of a fault in the SSD 20 by using the historical information 132, for example.

When detecting that the current value or the worst value is an abnormal value (an S.M.A.R.T. abnormality) in at least some of the attributes (vendor attributes) in the S.M.A.R.T.-.LOG in the historical information, the monitoring unit 112a detects a sign of a fault of the SSD 20.

Additionally, at the time of detection of an S.M.A.R.T. abnormality by the monitoring unit 112a, an original threshold may be provided instead of and separate from a threshold contained in the S.M.A.R.T. value, enabling the S.M.A.R.T. abnormality to be detected on the basis of this original threshold.

Here, with respect to an original threshold, for example, parameters that differ between S.M.A.R.T. values under a condition that a failure is present ("Fail") and S.M.A.R.T. values under a condition that a failure is absent ("OK"), for the SSDs 20 of the same model are extracted, and changes in these parameters are acquired as statistical information, thereby creating the original threshold.

Note that, like the monitoring unit 112 of the embodiment, the monitoring unit 112a may detect a sign of a fault in the SSD 20 by detecting the number of errors of writing to the storage area 22 of the SSD 20, or by detecting a decrease in speed of reading or writing to the storage area 22 of the SSD 20.

The technique for detecting a sign of a fault in the SSD 20 is not limited to the aforementioned one, and may be carried out in various modified forms. That is, other techniques different from the aforementioned technique may be used, and the determination may be made by selectively combining some of techniques as appropriate.

Note that it will be understood that detecting a sign of a fault in the SSD 20 by the monitoring unit 112a is not limited to these techniques, other techniques may be used, and these techniques may also be carried out in various modified forms. Also, the monitoring unit 112a may carry out these various techniques for detecting a sign of a fault in the SSD 20 by selectively combining them as appropriate.

Figure 11:
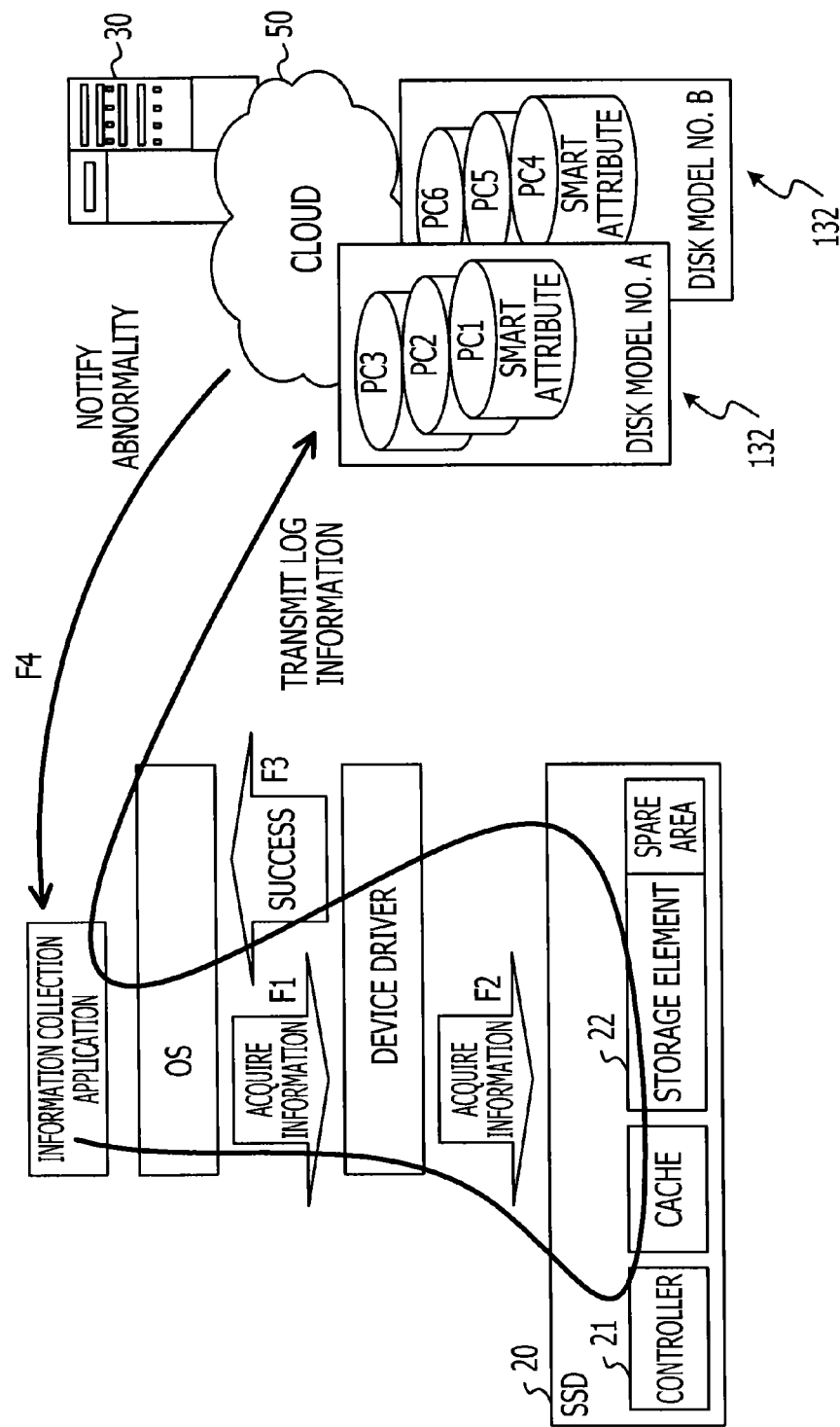
FIG. 11 illustrates a technique for detecting a sign of a fault of an SSD in a modification of the computer systems as the exemplary embodiment.

A technique for detecting a sign of a fault of the SSD 20 in the modification of the computer system 1 as the exemplary embodiment, which is configured as described above, will be described with reference to FIG. 11.

The information collection unit 115 (information collection application) notifies a request for information acquisition to the SSD 20 via the OS and the device driver (refer to arrows F1 and F2). The controller 21 of the SSD 20 notifies the device driver of S.M.A.R.T. values, and the device driver provides the OS a notification to the effect that information collection has succeeded (refer to arrow F3).

The information collection unit 115 transmits the collected S.M.A.R.T. values, together with the PC ID of the computer 10 and the disk serial number of the SSD 20, as log information to the computer 30 via the network 50.

In the computer 30, the monitoring unit 112a registers the log information received from the computer 10 in the historical information 132 corresponding to the disk model number of the SSD 20.

When the monitoring unit 112a compares the value of the predetermined attribute in the S.M.A.R.T. values of the historical information 132 with a threshold, and detects that the value of the attribute exceeds the threshold (an S.M.A.R.T. abnormality), the monitoring unit 112a detects a sign of a fault of the SSD 20.

Upon detecting a sign of a fault of the SSD 20, the monitoring unit 112a provides a notification to the effect that an S.M.A.R.T. abnormality has been detected (abnormality notification) to the computer 10 including the SSD 20 where S.M.A.R.T. abnormality has been detected. Note that, in the computer 10 that has received such an abnormality notification, the copy I/O processing unit 113, instead of the I/O processing unit 111, reads or writes data to the SSD 20.

In this way, according to the modification of the computer 10 as the exemplary embodiment, the same advantages as the embodiment are obtained. Furthermore, in the computer 30, the sign of a fault of the SSD 20 is detected on the basis of the historical information 132 created by log information received from one or more computers 10. Thus, the sign of a fault of the SSD 20 may be accurately detected.

For example, the historical information 132 is provided for every disk model number of the SSDs 20, and the S.M.A.R.T. abnormality is detected on the basis of an original threshold at the time of detection of an S.M.A.R.T. abnormality by the monitoring unit 112a. Thereby, detection of the sign of a fault that is suitable for the model characteristic of the SSD 20 may be achieved.

Additionally, with respect to an original threshold, for example, parameters that differ between an S.M.A.R.T. value under a condition that Failure is "Fail" and an S.M.A.R.T. value under a condition that Failure is "OK", for the SSDs 20 of the same model, are extracted, and changes in these parameters are collected as statistical information, thereby creating the original threshold. Thus, the sign of a fault may be detected so as to be suitable for the usage status of the SSD 20 and a situation where a fault has occurred in reality.

(C) Others

The disclosed technique is not limited to the foregoing embodiment and modifications, and may be carried out in various modified forms without departing from the spirit and scope of the present disclosure. Each configuration and each process of the present disclosure may be selected if desired, or may be combined as appropriate.

For example, although, in the foregoing embodiment and modifications, the restoration unit 116 is included in the computer 30, and the data of the SSD 20 is restored in this computer 30, the present disclosure is not limited to this.

For example, an OS, a control program for implementing the function as the restoration unit 116, and a copy of the second copy data table 131 are stored in memory, such as a USB memory, and this memory is connected to the computer 10.

The computer 10 is started up with the OS stored in this memory and the control program is executed, thereby enabling the CPU 11 of the computer 10 to function as the restoration unit 116. Additionally, a new SSD serving as a destination location for restored data is connected to the computer 10.

In the computer 10, using data read from the SSD 20 in the read-only mode and a copy of the second copy data table 131 stored in the memory, the restoration unit 116 restores data and stores the created restoration data in the new SSD. Thus, the SSD 20 may also be recovered in the computer 10.

Moreover, although, in the foregoing embodiment and modifications, the example in which the SSD 20 is included as a storage device in the computer 10 has been described, the present disclosure is not limited to this and may be applied to storage devices other than the SSD.

Moreover, the present disclosure may be carried out and made by those skilled in the art through the foregoing disclosure.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An information processing apparatus configured to interact with a storage device, the apparatus comprising:
    a cache configured to store data from an operating system and to write the data to a storage area of the storage device;
    a memory; and
    a processor configured to execute a plurality of instructions, the instructions comprising:
        storing the data in the cache;
        notifying a completion of writing of the data to the operating system after the storing the data in the cache;
        detecting at least one of a sign of a fault and an incidence of a fault of the storage device;
        prohibiting write access to a storage area of the storage device after detecting incidence of the fault;
        permitting read access to the storage area after detecting incidence of the fault; and
        storing the data in the cache and a copy of the data as first copy data in the memory after detecting the sign of the fault.

2. The information processing apparatus according to claim 1, wherein the instructions further comprise:
    detecting occurrence of the fault in the storage device; and
    storing a copy of the first copy data as second copy data in another storage device when the occurrence of the fault is detected.

3. The information processing apparatus according to claim 2, wherein the instructions further comprise outputting the first copy data in response to a request for reading data stored in the storage device when the occurrence of the fault is detected.

4. The information processing apparatus according to claim 2, wherein the detecting includes detecting the occurrence of the fault based on a result of a comparison between data read from the storage device and the first copy data.

5. The information processing apparatus according to claim 2, wherein the instructions further comprise creating data that is to be written to the storage device before the occurrence of the fault based on data read from the storage device and the second copy data.

6. The information processing apparatus according to claim 1, wherein the instructions comprise providing the first copy data in response to a request for reading data stored in the storage device when data read from the storage device is different from the first copy data.

7. The information processing apparatus according to claim 1, wherein the detecting includes detecting the at least one of the sign of the fault and the incidence of the fault based on a self-diagnostic history of the storage device.

8. A method for controlling an information processing apparatus configured to interact with a storage device, the method comprising:
   storing data from an operating system in a cache of the information processing apparatus;
   notifying a completion of writing of the data to the operating system after storing the data in the cache;
   detecting at least one of a sign of a fault and incidence of a fault of the storage device;
   prohibiting write access to a storage area of the storage device after detecting incidence of the fault;
   permitting read access to the storage area after detecting incidence of the fault; and
   storing the data in the cache and a copy of the data as first copy data in a memory of the information processing apparatus after detecting the sign of the fault.

9. The method according to claim 8, further comprising:
   detecting occurrence of the fault in the storage device; and
   storing a copy of the first copy data as second copy data in another storage device when the occurrence of the fault is detected.

10. The method according to claim 9, further comprising:
    outputting the first copy data in response to a request for reading data stored in the storage device when the occurrence of the fault in the storage device is detected.

11. The method according to claim 9, wherein the detecting occurrence of the fault includes detecting the occurrence of the fault based on a result of comparison between data read from the storage device and the first copy data.

12. The method according to claim 9, further comprising:
    creating data that is to be written to the storage device before the occurrence of the fault based on data read from the storage device and the second copy data.

13. The method according to claim 8, further comprising:
    providing the first copy data in response to a request for reading data stored in the storage device when data read from the storage device is different from the first copy data.

14. The method according to claim 8, wherein the detecting includes detecting the at least one of the sign of the fault and the incidence of the fault based on a self-diagnostic history of the storage device.

15. A non-transitory computer-readable storage medium that stores a control program for an information processing apparatus configured to interact with a storage device, the control program causing the information processing apparatus to execute a process, the process comprising:
    storing data from an operating system in a cache of the information processing apparatus;
    notifying a completion of writing of the data to the operating system after storing the data in the cache;
    detecting at least one of a sign of a fault and incidence of a fault of the storage device;
    prohibiting write access to a storage area of the storage device after detecting incidence of the fault;
    permitting read access to the storage area after detecting incidence of the fault; and
    storing the data in the cache and a copy of the data as first copy data in a memory of the information processing apparatus after detecting the sign of the fault.

16. An information processing apparatus configured to interact with a storage device, the information processing apparatus comprising:
    a cache configured to store data from an operating system and to write the data to a storage area of the storage device;
    a memory; and
    circuitry configured to
       store data in the cache;
       notify a completion of writing of the data to the operating system after the storing the data in the cache;
       detect at least one of a sign of a fault and an incidence of a fault of the storage device;
       prohibit write access to a storage area of the storage device after detecting incidence of the fault;
       permit read access to the storage area after detecting incidence of the fault;
       store the data in the cache and a copy of the data as first copy data in the memory after detecting the sign of the fault; and
       creating restoration data that is to be written to the storage device based on data stored in the storage device and the first copy data stored in the memory when occurrence of the fault of the storage device is detected.

17. The information processing apparatus according to claim 16, wherein the circuitry is further configured to detect the sign of the fault of the storage device.

* * * * *